United States Patent [19]
Vassiliou

[11] Patent Number: 5,753,293
[45] Date of Patent: *May 19, 1998

[54] SIMULATED EGG YOLK AND METHOD OF MAKING SAME

[76] Inventor: Eustathios Vassiliou, 12 S. Townview La., Newark, Del. 19711

[*] Notice: The term of this patent shall not extend beyond the expiration date of Pat. No. 5,401,525.

[21] Appl. No.: 521,239

[22] Filed: Aug. 30, 1995

Related U.S. Application Data

[60] Continuation of Ser. No. 363,739, Dec. 23, 1994, Pat. No. 5,520,947, which is a division of Ser. No. 75,106, Jun. 11, 1993, Pat. No. 5,401,525, which is a continuation-in-part of Ser. No. 930,105, Aug. 14, 1992, Pat. No. 5,227,189, which is a continuation-in-part of Ser. No. 750,116, Aug. 26, 1991, Pat. No. 5,151,293, which is a continuation-in-part of Ser. No. 551,160, Jul. 11, 1990, Pat. No. 5,073,399.

[51] Int. Cl.$^6$ .................. A23L 1/0522; A23L 1/0532
[52] U.S. Cl. .............. 426/573; 426/104; 426/512; 426/516; 426/518; 426/519; 426/520; 426/576

[58] Field of Search ................... 426/104, 512, 426/516, 518, 519, 520, 573, 576; 99/485, 516, 534

[56] References Cited

U.S. PATENT DOCUMENTS

| | | | |
|---|---|---|---|
| 5,073,399 | 12/1991 | Vassilou | 426/614 |
| 5,227,189 | 7/1993 | Vassilou | 426/614 |

*Primary Examiner*—Helen Pratt

[57] ABSTRACT

Simulated egg yolk in the nature of a thermoreversible, preferably homogenized, gel which is non-flowable at room temperature is extruded into disk-like shapes. A restrictive barrier is formed around the egg yolk disks by a reverse method of first contacting the non-flowable yolk with a setting agent such as calcium chloride in water and then with a film former such as sodium alginate in water. The resulting simulated egg yolk looks and behaves like natural egg yolk and may be incorporated into natural egg white while preserving a separate phase, so one can make "sunny side up" and "easy over" eggs.

40 Claims, 2 Drawing Sheets

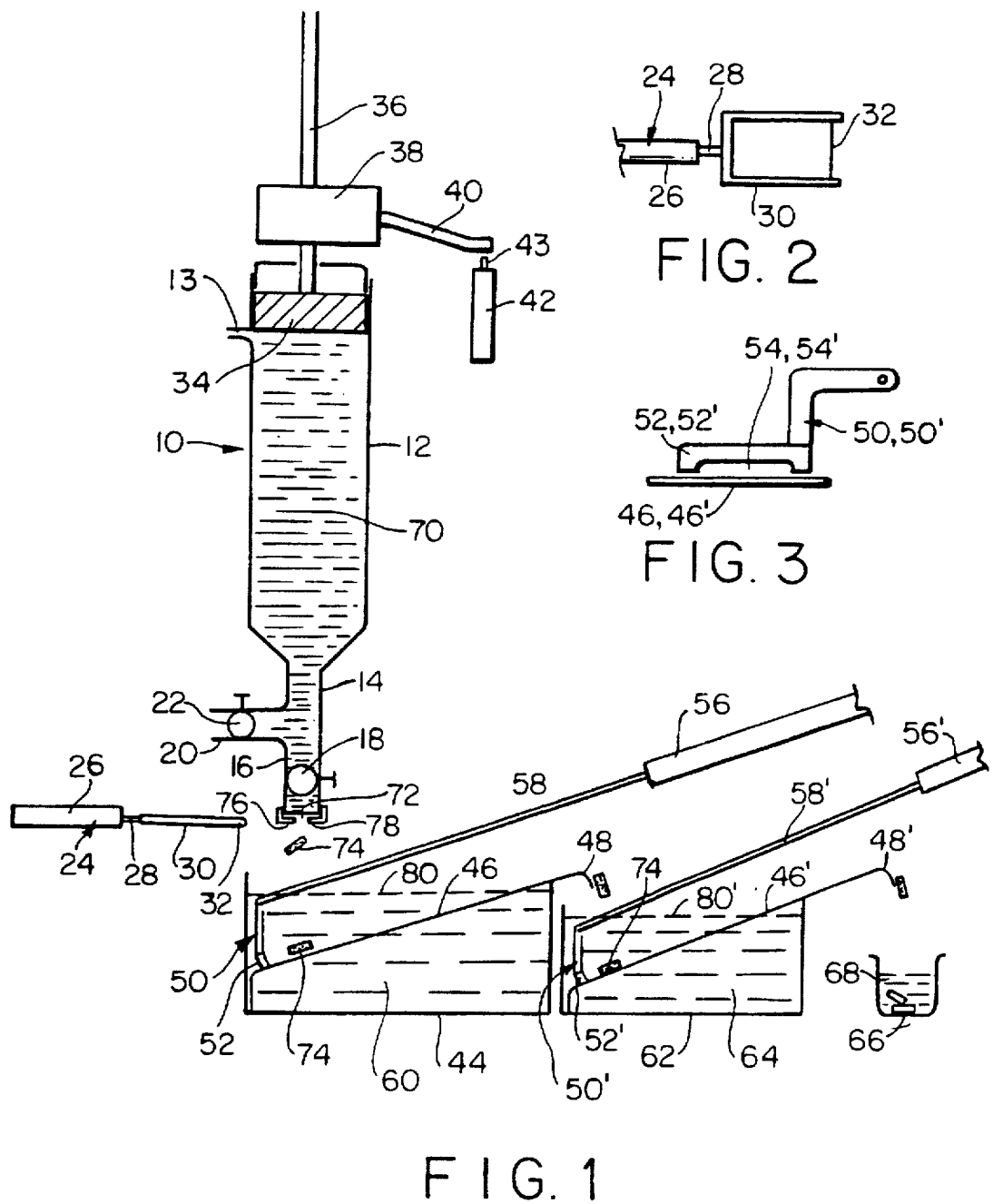

SIMULATED EGG YOLK AND METHOD OF MAKING SAME

BACKGROUND OF THE INVENTION

This is a continuation, of application Ser. No. 08/363,739, filed Dec. 23, 1994, now U.S. Pat. No. 5,520,947 entitled SIMULATED EGG YOLK AND METHOD OF MAKING SAME which is a divisional of application Ser. No. 08/75,106, filed Jun. 11, 1993, now U.S. Pat. No. 5,401,525, which is a Continuation-in-part of application Ser. No. 930,105 filed on Aug. 14, 1992, now U.S. Pat. No. 5,227,189, which is a Continuation-in-part of application Ser. No. 750,116 filed on Aug. 26, 1991, now U.S. Pat. No. 5,151,293, which is a Continuation-in-part of application Ser. No. 551,160 filed on Jul. 11, 1990, now U.S. Pat. No. 5,073,399 which are incorporated herein by reference.

The present invention relates in general to simulated eggs, including simulated egg yolk alone and those dispersed in a separate phase within liquid natural egg whites to provide simulated raw whole eggs, and more particularly, to cholesterol free simulated egg yolks capable of maintaining a separate phase in natural egg whites, so that upon cooking, the simulated egg yolk looks and behaves like natural egg yolk; and still more particularly, to such simulated egg yolks in the nature of a room temperature homogenized thermoreversible gel having a low gelatin content which are encapsulated in a restrictive barrier of an edible cross-linkable water soluble polymer formed in situ.

Although eggs represent an outstanding nutritional food which is enjoyed by many people, especially as part of one's breakfast, the fact is that natural egg yolk is one of the richest foods in cholesterol. This has forced a large number of people who are on cholesterol free diets from enjoying eating natural whole eggs. One practical and economically feasible solution has been to incorporate a simulated and preferably a cholesterol free egg yolk into natural egg white and to preserve them in separate phases, so that one can make, for example, a "sunny side up" and "over easy" egg. In this regard, there is known in the inventor's U.S. Pat. No. 5,073,399, which is incorporated by reference herein, a simulated egg yolk and simulated raw whole egg manufactured therewith constituting an edible liquid, a viscosity modifier which is preferably a positive thermoreversible gel former, and a colorant. The simulated egg yolks produced thereby, which may be encapsulated by a hydrocolloid restrictive barrier, are remarkably lifelike and are useful in the preparation of "sunny side up" and "over easy" eggs when dispersed in natural egg whites.

The inventor realized that in the preparation of a simulated whole raw egg for use in the production of a natural looking "sunny side up" or "over easy" egg, it is typically necessary to store the simulated egg yolk in a separate gelled phase within liquid natural egg white. It was observed that these simulated egg yolks tend to absorb water from the natural egg white, probably by osmosis, thereby undesirably increasing the weight and volume of the egg yolk. The absorption of water is undesirable because it decreases the viscosity of the egg yolk upon cooking, which adversely results in the reduction of the egg yolk's overall mechanical and/or physical strength, i.e., the ability to remain unbroken and to retain its integrity and shape prior to being purposefully broken after cooking when being eaten. The decrease in viscosity can result in the premature disruption of the structure of the discrete egg yolk when in the molten state, such as during cooking, and uncontrolled running of the egg yolk at serving temperatures may take place. In addition, the reduction in the egg yolk's mechanical and/or physical strength requires that the egg yolk be handled delicately.

In the inventor's U.S. Pat. No. 5,151,293, which is also hereby incorporated by reference, a number of possible remedies to overcome these problems of water absorption were proposed. It was observed that the positive thermoreversible gel former used in the production of the simulated egg yolk appeared to be the driving force behind the absorption of water from natural egg white. Although it was proposed to minimize the amount of gel former used, this also had the tendency of producing "delicate" egg yolks whose viscosity will change prematurely such that the egg yolk's monolithic structure is lost during manufacturing and/or handling, including during cooking. Thus, the proposed solution created other problems which were not fully resolved.

Another proposed method of reducing the initial weight gain of a simulated egg yolk, yet maintaining its viscosity and mechanical and/or physical strength, is by the use of a restrictive barrier. Several methods of imparting such a barrier to the egg yolk before being added to liquid natural egg white are described, such as a cross-linked membrane of an edible resin, e.g. an alginate, a pectin, and the like. A multivalent cation, such as calcium or aluminum in the form of a salt may be used as the cross-linking agent. A restrictive barrier can also be formed from hydrateable edible polymeric compounds or hydrocolloids which give rise to substantial instantaneous increase in viscosity as soon as they come into contact with and start dissolving in aqueous systems.

Also disclosed is reducing the absorption of water by adding a solute to the liquid egg white such that smaller osmotic pressure differential will exist between the liquid egg white and the simulated egg yolk. This is expected to minimize the force thought to be driving water into the egg yolk. Finally, the inventor proposed immersing the egg yolk in an aqueous medium which provides an accelerated tendency of the egg yolk to absorb water. In this technique, the egg yolk is formulated with less water than would otherwise be used. The egg yolk is then immersed into water until the degree of water absorption desirable has been achieved. When added to liquid egg white, the thus created egg yolk does not exhibit a strong tendency to further absorb water.

Although the '293 patent mentions forming a restrictive barrier layer from a cross-linked film of an edible resin, there is no reference to a particular method of forming the barrier around an egg yolk. The methods used so far to produce restrictive barriers around simulated egg yolks were both time consuming and cumbersome. For example, Forkner, U.S. Pat. No. 4,409,249, discusses briefly the use of cross-linked hydrocolloids, such as alginates, with calcium salts, as edible membranes around artificial liquid yolks to hold the shape of the egg yolk. Cox et al., U.S. Pat. No. 5,192,566, discloses various detailed methods of forming a restrictive barrier around a simulated liquid egg yolk. In both Forkner and Cox et al, frozen or otherwise immobilized liquid egg yolk is coated with a restrictive barrier forming solution or dispersion such as one containing edible hydrocolloids, for example, sodium alginate. The coated egg yolk is treated to form the restrictive barrier by contact with a reactive composition in the form of a setting bath containing a setting agent, for example, calcium chloride. Cox et al. discusses two alternative methods, the first of which they co-extrude a central yolk portion with a surrounding portion containing the film former, and in the second they include the film former in the formulation of the yolk. In the preferred method of Cox et al., the second method, the restrictive barrier forming compounds are mixed with the egg yolk components in sufficient quantities to form a barrier on the outer surface of the egg yolk when contacted with a setting agent. The liquid egg yolk is extruded in the form of discrete liquid globules into a setting bath. These methods are undesirably time consuming, requiring the yolks to stay in the setting bath for 8–15 minutes, followed by rinsing for about 10–20 minutes.

This conventional process of forming a restrictive barrier in accordance with either Cox et al. or Forkner has been found to present a large number of disadvantages resulting in a simulated egg yolk having a poorly formed barrier. A major drawback is the commercially undesirable (which may come to the point of being unacceptable) length of time needed to complete the process. When attempting to use reasonably short times for the conventional process, additional drawbacks, just to mention a few, include, but are not limited to, irreproducibility of the quality of the membrane, thickness variability, openings in the membrane structure, weak regions which may break easily, and tough to chew regions making the consumption of the respective egg unpleasant.

More particularly, the coating of the egg yolk first with a restrictive barrier forming compound often results in a barrier which is not only flimsy, but also not uniform in thickness. When immersed in the setting bath, the restrictive barrier forming compound often does not cross-link uniformly, in particular, in those regions having a thicker layer, thereby requiring extended residence times. In addition, it has been found that in those regions where an excess of restrictive barrier forming compound is present, incomplete cross-linking may still occur, resulting in the barrier layer being relatively weak, and in fact, may be in the nature of a loose slurry. These regions are potential defect sites which can cause the simulated egg yolk to prematurely rupture during handling.

The setting bath which contains the setting agent, for example, calcium chloride being the major representative of setting agent, even at small concentrations is known to have a bitter taste. Any excess setting agent which is retained on the egg yolk will subsequently dissolve in the liquid egg whites into which the egg yolk is deposited. This will result in the finally cooked whole egg having a bitter unpleasant taste which is unacceptable to the consumer. To avoid this problem, it becomes necessary to subsequently subject the egg yolk to an extensive rinse bath which is highly undesirable from the standpoint of both process time and economy.

A further disadvantage is the high probability of a remaining slippery fluid region under the membrane and surrounding the solid at room temperature yolk portion, which fluid region consists of unset or incompletely set film former. All these disadvantages render these processes very delicate, sensitive to unforeseen external parameters, time consuming, and cumbersome. Still more particularly, according to the conventional method, the yolk is dipped into a solution of a film former, which is very viscous even at low concentrations of film former, and therefore it produces an uneven thick film on the yolk. When this film comes in contact with the solution of the setting agent, a thin cross-linked skin is formed at the top of the film, away from the yolk. The skin does not allow easy access to the rest of the trapped film former, and thus, one has to wait for a long time (many minutes) for the setting agent, for example calcium ions, to diffuse through the skin and continue setting the rest of the resin. This increases the thickness of the skin and makes the diffusion process more and more difficult. If one does not wait for all the time required to complete the setting throughout the thickness of the film, there will remain a slippery fluid region under the skin, adjacent to the yolk, rendering the thus far made membrane flimsy and not supported by the non-flowable yolk. Further, since the outermost skin of the membrane will be fully cross-linked, due to the abundance of setting agent in that region, its adhesion to the white will be minimal, if any at all, upon cooking the yolk and coagulating the white. It is a very well known fact that fully cross-linked surfaces are notorious for refusing to adhere to other surfaces, and they may even be used as release structures. Thus, special treatment will be needed to provide adhesion of the membrane to the white.

Since the environment at which the membrane was formed in this case includes an abundance of setting agent, thorough rinsing becomes necessary in order to remove the setting agent (calcium chloride, for example) before the processed yolk is introduced into the egg white. The task of removing the setting agent becomes even more difficult, due to the fact that the portion of setting agent which has been trapped within the fully cross-linked outer part of the membrane, and which travels outward at a very low speed, does not find any uncross-linked sites to be bound, and therefore it has to be substantially removed completely to avoid the undesirable taste and other ailments that may introduce to the white.

Neither of the aforementioned patents provide a commercially feasible method of manufacturing large quantities of high quality simulated egg yolk and "friable" (either "sunny side up" or "over easy") or "poachable" whole eggs. In the case of U.S. Pat. No. 5,151,293, the problems of commercializable methods are complicated by attempting to balance the complexities of water absorption and the need for a strong, monolithic simulated egg yolk with a highly controlled temperature/viscosity profile (yolk formulated to only become runny and lose its shape when desired).

These problems have been solved by the provision of a commercially feasible mass production method for the formation of high quality simulated egg yolk which is extrudable at or below room temperature in accordance with the present invention. The resulting simulated egg yolk, when added to liquid natural egg white and, thereafter, fried, yields a realistic egg in flavor, texture and look. The resulting egg retains a discrete egg yolk, even at serving temperatures, which naturally runs upon being disturbed. Thus, the resulting egg product looks, tastes and behaves as a natural fried or poached egg.

SUMMARY OF THE INVENTION

Applicant has discovered that by completely reversing the steps of the aforementioned conventional process, a membrane lacking the above discussed disadvantages can be made. Thus, according to the present invention (hereinafter called "reverse method"), a yolk, being non-flowable at the temperature of the operation of the process, is initially coated with the setting agent, and then it is dipped in a solution of the film former, from where it is preferably transferred directly to egg white, without the need of rinsing. The whole process takes but a few seconds, and results in simulated egg yolks of superb quality to those of Forkner and Cox et al.

Applicant speculates, without this being construed as limiting the scope of the present invention, that the elimination of the disadvantages of the conventional method by using the reverse method are the result of the following. Film formers, such as sodium alginate for example, are polymers which when being in solution give high viscosity. Since the higher the molecular weight of a given polymer, the stronger and more integral films it will produce, one would prefer to use the highest molecular weight grade available of the given film former. Unfortunately, as the molecular weight increases the viscosity of the solution also increases. Thus, one has to compromise with regard to film integrity of the membrane, viscosity of the solution, and concentration of the film former in the solution. In any event, dipping a non-flowable object in such a compromised film former solution, necessarily produces a wet mushy film having rather high and uneven thickness with low concentration of film former.

On the other hand, setting agents, such as calcium chloride for example, give very low viscosity when in solution. Thus, dipping of a solid in a solution of a setting agent, produces a very thin and uniform coating, which may also be applied easily by other techniques, such as spraying for example.

According to the reverse method of the present invention, the yolk is dipped in a solution of a setting agent, calcium chloride in water for example, which immediately forms a very thin uniform coating, the low viscosity being a considerable contributing factor. The thusly coated egg yolk is in turn dipped into a solution of a film former, such as for example sodium alginate in water. As soon as the thin and uniform coating of setting agent comes in contact with the film former solution, a reaction takes place, instantaneously for all practical purposes. Not only this, but the reaction takes place on the immediate surface of the egg yolk, forming a well supported membrane on a non-flowable substrate. In the case of the reverse method, the very thin, uniform coating of setting agent, well supported on the non-flowable yolk, finds itself in an environment of abundant film former. Since there is only a very small predetermined amount of setting agent within a very thin film of very low viscosity, the cross-linking reaction takes place substantially instantaneously in the abundance of the film former. Even if a small amount of the setting agent does not react immediately, there is plenty of time to react even after the processed yolk has been added to the egg white. This is because, as mentioned above, the processed yolk does not need any rinsing before being added to the egg white, as the viscous unreacted edible polymer solution surrounding now the processed yolk does not impart undesirable characteristics to the white.

By the time the viscous unreacted edible polymer (film former) solution dissolves in the egg white, the remaining traces of the setting agent find a chance to react with the film former molecules, and thus become bound. With this process, the fully cross-linked polymer is in direct contact with the egg yolk substantially instantaneously, which gives the membrane highly improved integrity, while the outside of the membrane becomes gradually less and less cross-linked to the point of no cross-linking at all. This configuration provides a membrane having good adhesion or bonding with the white after cooking, a problem which has not been resolved satisfactorily so far with the conventionally made membranes. It should be noted, however, that if desired, the processed yolk as described above, does not have to be added to the egg white immediately after it has been made.

Other types of application, such as spraying for example, of one or both coatings in either, the conventional or the reverse method have similar ramifications, producing similar results, respectively. Accordingly, the reverse method of the present invention is considerably superior to the conventional method for producing an edible membrane around a yolk, with regard to a number of attributes, including simplicity, time involved, and quality of product made. The reasons why have not been clearly established. Applicant has provided speculations, which as aforementioned, should not be construed as limiting the scope of Applicant's invention.

It is one object of the present invention to provide a method of producing a simulated egg yolk in the form of an extrudable gel at about or below room temperature and which remains solid, discrete and monolithic in shape during cooking, but behaves as a natural egg yolk when the yolk is broken at serving temperatures.

It is another object of the present invention to provide a commercially feasible, highly reproducible, efficient method for producing such simulated egg yolks.

It is another object of the present invention to provide a simulated egg yolk in the form of a thermoreversible homogenized gel which does not require the presence of a restrictive barrier to maintain its shape.

More particularly, the present invention pursuant to one embodiment provides a simulated egg yolk comprising a mixture of simulated egg yolk components, the components at least including an edible liquid and a positive thermoreversible gel former, the positive thermoreversible gel former present in an amount of from about 2.5–9.0 parts per hundred parts by weight of the edible liquid, the egg yolk being a nonflowable thermoreversible homogenized gel at room temperature so as to substantially retain its shape until being heated to a higher temperature at which the egg yolk becomes flowable, thereby resembling a natural egg yolk.

In accordance with another embodiment of the present invention there is described a shaped simulated egg yolk comprising a mixture of simulated egg yolk components, the components at least including an edible liquid and a positive thermoreversible gel former, the positive thermoreversible gel former present in an amount of from about 2.5–9.0 parts per hundred parts by weight of the edible liquid, the mixture having been heated above room temperature and subsequently having been cooled under continuous mixing until the mixture has formed a thermoreversible homogenized gel, the gel having been extruded at a temperature lower than the melting point of the gel into a predetermined shape to form the shaped simulated egg yolk, the egg yolk being non-flowable at room temperature.

In accordance with another embodiment of the present invention there is described a shaped simulated egg yolk comprising a mixture of simulated egg yolk components, the components at least including an edible liquid and a positive thermoreversible gel former, the positive thermoreversible gel former present in an amount of from about 2.5–9.0 parts per hundred parts by weight of the edible liquid, the mixture having been heated above room temperature and subsequently having been cooled to form a conventional gel, the conventional gel having been pureed to form a thermoreversible homogenized gel, the thermoreversible homogenized gel having been extruded at room temperature into a predetermined shape to form the shaped simulated egg yolk, the egg yolk being non-flowable at room temperature.

In accordance with another embodiment of the present invention there is described a simulated egg yolk comprising a mixture of simulated egg yolk components and a restrictive barrier encapsulating the egg yolk, the barrier formed by coating the mixture first with a setting agent, and then, with a film former which is reactive with the setting agent to form the barrier.

In accordance with another embodiment of the present invention there is described a simulated egg yolk comprising a mixture of simulated egg yolk components, the mixture being in the form of a nonflowable homogenized gel at about room temperature.

In accordance with another embodiment of the present invention there is described a method of making a simulated egg yolk comprising preparing a mixture of simulated egg yolk components and encapsulating the mixture with a restrictive barrier, the barrier formed by coating the mixture first with a setting agent, and then, with a film former which is reactive with the setting agent to form the barrier.

In accordance with another embodiment of the present invention there is described a method of making a simulated egg yolk comprising preparing a mixture of simulated egg yolk components; heating the mixture above room temperature; then cooling the heated mixture in accordance with the steps selected from the group consisting of (i) while cooling the mixture continuously mixing the components until the mixture forms a homogenized gel, and (ii) until the mixture forms a conventional gel, and then pureeing the conventional gel in a manner to form a homogenized gel; and shaping the homogenized gel to form the simulated egg yolk.

In accordance with another embodiment of the present invention there is described a method of preparing a simulated raw whole egg comprising the steps of:

(a) making a mixture comprising water, gelatin having a bloom value in the range of 200 to 300 in an amount of from about 2.5–9.0 parts per hundred parts by weight of the water, freeze-thaw stable starch in an amount of from about 6.0–12.0 parts per hundred parts by weight of the water, fat free milk solids in an amount of from about 4.0–8.0 parts per hundred parts by weight of the water, a colorant, and optionally a flavor;

(b) raising the temperature of the mixture until the gelatin is dissolved and the starch is hydrated;

(c) optionally adding egg white in an amount equivalent to about 2.5–10.0 parts of egg white solids per hundred parts of water, the addition being made after the temperature of the mixture has dropped below the coagulation temperature of the egg white;

(d) forming a positive thermoreversible homogenized gel by following a set of steps selected from the group consisting of cooling the heated mixture to a temperature under 50° F. while continuously mixing until the homogenized gel has been formed, and cooling the heated mixture until the mixture forms a conventional gel, and then pureeing the conventional gel in a manner to form the homogenized gel;

(e) extruding the positive thermoreversible homogenized gel to form disk shaped simulated yolks;

(f) applying a coating comprising calcium ions on the simulated yolks;

(g) applying an additional coating comprising sodium alginate on the yolks of step (f), the calcium ions setting the sodium alginate to form a restrictive barrier; and (h) adding the yolks of step (g) to egg white.

In accordance with another embodiment of the present invention there is described an apparatus for encapsulating a simulated egg yolk with a restrictive barrier, the apparatus comprising means for extruding a mixture of simulated egg yolk components in the nature of a gel into a simulated egg yolk of predetermined shape, a first bath containing a setting agent, a first support having at least one portion thereof within the setting agent for receiving thereon the simulated egg yolk, a second bath adjacent the first bath containing a film former which is reactive with the setting agent to form the barrier, and first means for sliding the simulated egg yolk across a surface of the first support from within the setting agent in the first bath into the film former in the second bath.

BRIEF DESCRIPTION OF THE DRAWINGS

The above description, as well as further objects, features and advantages of the present invention will be more fully understood with reference to the following detailed description of a simulated egg yolk and method of making same, when taken in conjunction with the accompanying drawings, wherein:

FIG. 1 is a diagrammatic illustration of an apparatus for extruding simulated egg yolk material in the form of a thermoreversible gel into a pair of baths containing a setting agent and a film former, respectively, for forming a restrictive barrier layer thereon;

FIG. 2 is a diagrammatic illustration of a wire cutter for cutting the extruded simulated egg yolk material into flat disk-like patties and the like;

FIG. 3 is a diagrammatic illustration of a portion of an assembly for advancing patties of extruded simulated egg yolk material along an inclined plate-like support from within one bath to another.

DETAILED DESCRIPTION OF THE PREFERRED EMBODIMENTS

Figure 4:
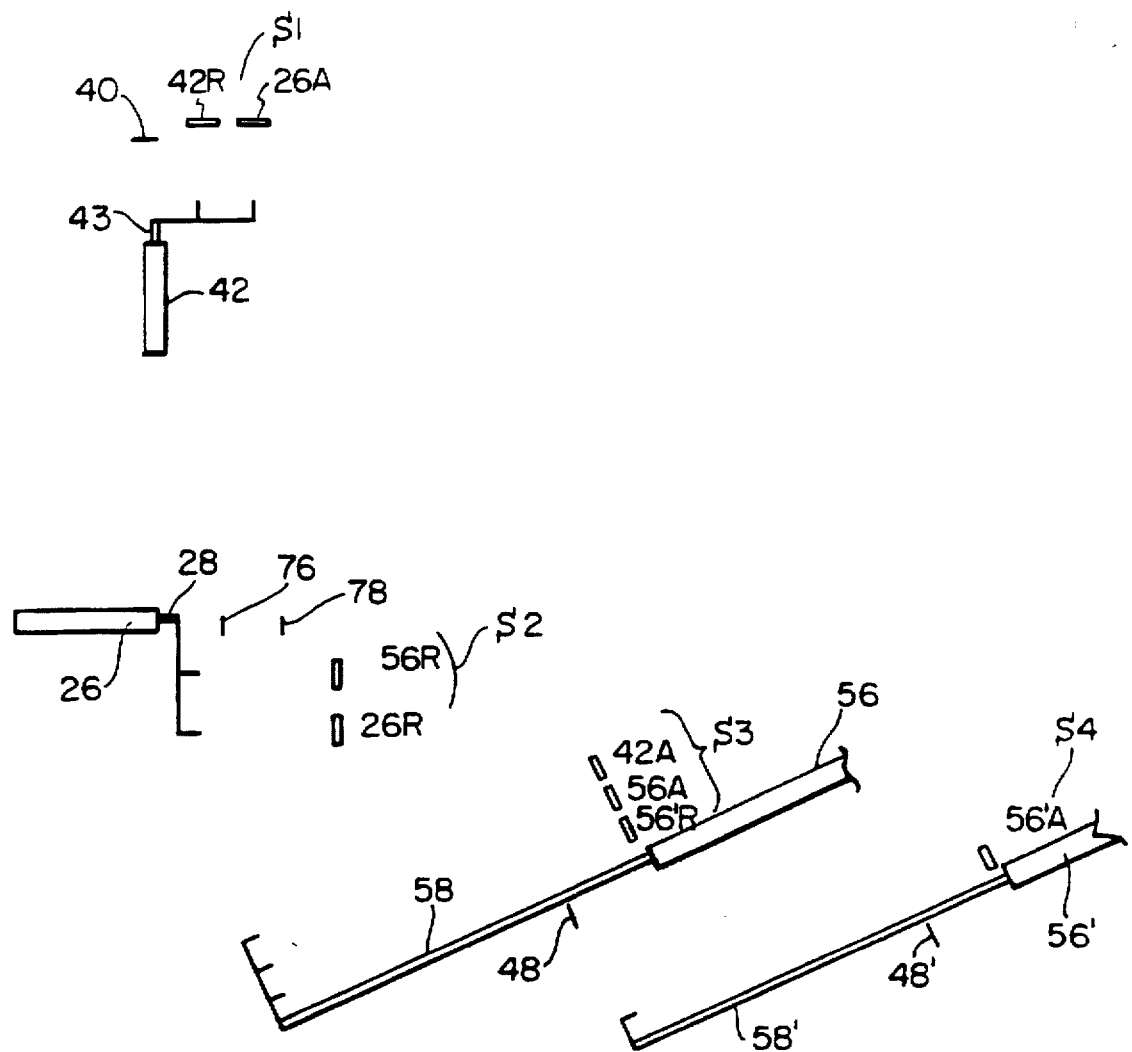
FIG. 4 is a diagrammatic illustration of the activating switches for operation of the apparatus of the present invention.

Liquid "simulated egg yolk components" as used herein are the components from which the simulated egg yolk in accordance with the present invention is produced. Generally, these simulated egg yolks include the formulations described in the inventor's aforementioned U.S. Pat. Nos. 5,073,399 and 5,151,293 including an edible liquid, a viscosity modifier in the nature of a gel former, a viscosity builder in the nature of a starch and a coloring agent. Preferably, however, the formulation will include non-fat dry milk, starch, gelatin, optionally salt, natural egg flavor, beta carotene, water and/or one or more compounds of real egg. As disclosed in the aforementioned patents, other ingredients can be added as desired.

Liquid "natural egg white" or "egg white" as used herein generally refers to preferably naturally occurring egg white derived from chicken eggs. Of course, the egg white may be synthetic and/or can include other ingredients. For example, a gum can be added to the liquid egg white, particularly previously pasteurized liquid egg white, to adjust its viscosity. However, there is no requirement that the egg white include any such ingredients.

The simulated egg yolk of the present invention is constituted from a mixture of components, at least one of which being a viscosity modifier which is present at relatively low percentages, yet providing a nonflowable extrudable gel at room temperature so as to substantially retain its shape until being heated to a higher temperature at which the egg yolk becomes flowable. The viscosity modifiers are those materials known as positive gel formers, and preferably those which are thermoreversible, and negative gel formers, and preferably those which are nonreversible. A preferred example of a positive thermoreversible gel former is gelatin which is obtained from a collagen found in animal tissues, including the skin, tendons, and ossein of bones. Gelatin is commercially available under the mark KNOX which is sold by Knox Gelatin, Inc., Englewood, N.J. Examples of other companies offering gelatin are Horbel, Lebanon, N.J., Germantown Manufacturing Company, Broomall, Pa., and Atlantic Gelatin, Woburn, Mass.

The central role of the viscosity modifier is to provide the simulated egg yolk with the ability to preserve its desired shape during its manufacture and during the period of time the egg yolk is stored and handled while being in liquid egg white. In order to prevent excessive water absorption during prolonged storage of the simulated egg yolk in natural egg white, it is preferred that the simulated egg yolk components include a rather small, but still effective amount of thermoreversible gel former, such as gelatin, for example. The useful range of gelatin will be in the range of from about 2.5–9% by weight of the edible liquid present, and preferably from about 3–6% by weight of the edible liquid, and most preferably between 3.0–4.0% by weight of the edible liquid.

At gel levels below about 2.5% by weight of the edible liquid, it is contemplated that the simulated egg yolk would be rendered excessively weak making it difficult to handle and maintain intact. Due to the inherent weakness of the egg yolk resulting from the low gelatin percentage, a number of known processes for forming the shaped egg yolk are not feasible.

For example, in the conventional molding process, when the egg yolk cools, it expands making it difficult to remove from the mold. In addition, evaporation of water from the surface of the yolk causes considerable sticking of the yolk to the mold at the common boundary of the mold, the environmental air, and the yolk surface. Furthermore, the substantially perfectly smooth interface between the yolk and the mold produces vacuum at said interface which hinders the separation of the yolk from the mold. Removing the egg yolk without damage is rendered even more difficult due to the inherent weakness of the egg yolk. In a starch molding process, powdered starch is compacted to form individual molds to receive the liquid simulated egg yolk. After cooling, the compacted starch is separated from the molded simulated egg yolk by tumbling through sieves. This tumbling has rendered the starch process generally impractical for use with simulated egg yolks having a low gelatin content due to their inherent weakness.

Notwithstanding the low gelatin content, it has been found possible to convert the liquid simulated egg yolk from its heated condition into an extrudable gel at about or below room temperature in accordance with the present invention. By "thermoreversible homogenized gel" in accordance with the present invention, it is meant:

(1) the composition of the "thermoreversible homogenized gel" is such that it forms a "conventional gel" (having an appearance similar to that of "jello", for example), when the formation takes place in a substantially static mode, i.e., without substantial mixing, by cooling the composition from a higher temperature, at which temperature the composition is flowable and pourable, to a lower temperature at which gelation takes place in a period of time;

(2) the formation of the "thermoreversible homogenized gel" takes place by stirring or mixing, such as for example by pureeing, the gel during substantially the whole period the gel is being formed, or after the gelation process has been completed or both; and (3) by reheating to an appropriately higher temperature, the "thermoreversible homogenized gel" takes the form of a flowable and pourable composition again.

A material is considered to be non-flowable if for all practical purposes it does not flow under its own weight in the practice of the present invention. The "thermoreversible homogenized gel" has a somewhat duller appearance than a "conventional gel" of the same composition. While maintaining the basic non-flowable gel character, when an adequately high spreading force is applied onto it, the gel spreads uniformly, without breaking into discrete pieces, and thus it may be extruded uniformly through a die with substantially no deformations around the borders of the die, in contrast to a "conventional gel", which forms non-uniform extrudates, unless special care has been taken to include a pureeing stage before the final extrusion through the die. It appears that the "thermoreversible homogenized gel" yields to lower stresses than a "conventional gel" of the same composition, and it spreads uniformly.

Although the "thermoreversible homogenized gel" is considerably stickier than a "conventional gel" of the same composition, it loses its stickiness when brought in contact with a liquid or a powder. Actually, when it comes in contact with a liquid, it becomes very slippery, and therefore, very easy to handle, even by sliding onto a preferably wet solid surface.

A substantial advantage in using a "thermoreversible homogenized gel" in place of a "conventional gel" in the manufacture of the artificial yolks of the present invention, is that it provides a number of properties of utmost importance to the yolks:

(1) the yolks melt considerably more uniformly throughout their mass, thus providing a highly improved product;

(2) they melt considerably faster throughout their mass, thus allowing the yolk to melt completely by the time the white is fully cooked by frying, for example, without the need to turn the egg over, or to pour hot oil over the yolk;

(3) even if the yolk has not been melted completely, for any reason at all, the mouthfeel of the yolk is not objectionable, since, as believed by Applicant without this to imply any limitations to the scope of this invention, the gel structure yields easily in the mouth, and it melts faster and uniformly; and (4) without direct proof, and without this to imply any limitations to the scope of this invention, Applicant believes that the homogenized yolk tends to absorb less water upon prolonged contact with egg-white, due to the fact that the homogenized or broken structure of the "thermoreversible homogenized gel" has a considerably lower degree of membrane-like configuration than a "conventional gel" of the same composition, so that the osmotic pressures forcing water into the yolk are minimized.

In addition to the above, when the compositional parameters of preferred embodiments of the present invention are followed, the yolks attain further highly beneficial characteristics, such as (1) they stay in the molten state for a considerably longer time after they have been cooked;

(2) even if they re-solidify because of prolonged standing, and therefore cooling to room temperature, after they have been cooked, the mouthfeel does not become objectionable; and (3) water absorption is further minimized when the yolk has remained for prolonged periods of time in contact with the liquid egg-white.

In accordance with the present invention, a simulated egg yolk in the nature of an extrudable, thermoreversible homogenized gel at or below room temperature having a low gelatin content will now be described. The simulated egg yolk of the present invention comprises a mixture of components, including an edible liquid, viscosity modifier, and a colorant. The edible liquid is preferably aqueous, with the option of having different ingredients dissolved, emulsified, or dispersed therein. Examples of edible liquids are water and milk, among many others. The viscosity modifier, which provides a major part of the functions characterizing the egg yolks of the present invention, may be a single ingredient such as gelatin, or a combination of ingredients, each ingredient fulfilling at least partially the needs of a desired property. The viscosity modifier may be natural or artificial, intrinsic to the edible liquid, or external and added to the liquid. It may be also be a simple compound, or a mixture of compounds. It is only important that it provides desirable properties and flow characteristics according to the present invention. The colorant, if it has a yellowish cast, is necessary to make the simulated egg yolk resemble a real one, and in general, when it has any color at all except white, to make the egg yolk visibly distinguishable from the egg white. Thus, it may have a yellowish cast as known from beta carotene, or any other color for special effects.

In addition to the viscosity modifier, a simple viscosity builder may also be added to the mixture of ingredients. Starches and gums in general are examples of viscosity builders, which however, does not exclude them from being on certain occasions also gel formers. The important difference that a viscosity modifier such as gelatin, as compared to a simple viscosity builder such as starch may provide to the egg yolk is that the viscosity modifier gives a considerably more sudden viscosity change around a temperature range called gel or melting point, while the latter lacks such a well defined point, and the viscosity changes are rather gradual. The preferred viscosity builders according to this invention are starches, and especially freeze-thaw stable starches, such as Freezist M, for example, from Staley, Decatur, Ill.

Milk, preferably of the low-fat type, and more preferably of the non-fat type may be used as an additional ingredient in the composition of the simulated egg yolk of the present invention. The milk provides flavor, texture, opacity, and it may decrease syneresis or water separation, as well as being an additional source of protein. Its use in the formulation of the yolk of the present invention is highly desirable. In addition to these basic ingredients, a number of other ingredients such as oils, preferably unsaturated vegetable oils, may be used to complement the composition of the egg yolk, and emulsifiers for emulsifying the oils or for any other purpose. Typically, when milk solids are present, they may be used as an emulsifier for the oil or other hydrophobic substances. Miscellaneous other ingredients, such as vitamins, minerals, stabilizers, antioxidants, or pacifiers, and the like, well recognized and utilized in the art of food products may also be used to impart the respective desirable functions. Other specific ingredients useful in the preparation of a simulated egg yolk in accordance with the present invention are described in the '399 patent, which ingredients are incorporated herein by reference.

Broadly in accordance with the present invention, the requisite ingredients to form a simulated egg yolk in accordance with the present invention may be blended under agitation to a temperature in the range of 160°–180° F., within a jacketed kettle, for sufficient time until all ingredients are dissolved and no further substantial change in viscosity is observed. By way of example, the mixture is blended at its elevated temperature for about 5 to 20 minutes while the mixture attains a final viscosity in a way that is flowable. After attaining the final viscosity, the mixture of ingredients while being constantly agitated is cooled preferably using ice water or other suitable coolant until the mixture attains the consistency of an extrudable, non-flowable thermoreversible homogeneous gel. The extrudable gel is attained at a temperature of the mixture at approximately room temperature or below, wherein the mixture noticeably changes from a shiny to dull appearance. The mixture may be further cooled to a temperature in the range of from 32°–65° F. The time required to achieve the consistency of the homogenized gel decreases with temperature. In the absence of cooling with ice water, for example, the time at about room temperature, for the composition to change from a shiny appearance to dull is considerably longer to that needed if the mixture were cooled with ice water, for example, to a temperature lower than room temperature, such as 40°–50° F., for example.

Important to the formation of the low gelatin containing composition as an extrudable mixture is the setting of the mixture under continuous stirring while cooling. The ability to attain a uniform extrudable gel is contemplated to be the result of the continuous stirring while setting the mixture which prevents the formation of a highly branched gelatin network. Although the extrudable egg yolk mixture has a relatively high viscosity rendering the yolks non-flowable, such egg yolks become flowable when heated to cooking temperatures. The simulated egg yolk material may be stored at refrigerated temperatures prior to being extruded into individual egg yolk shapes, and subsequently encapsulated with the restrictive barrier.

Alternatively, the yolk mixture may be cooled under static conditions to form a conventional gel, and then pureed to form a homogenized gel according to this invention.

The baths of the cross-linkable edible resin (sodium alginate, for example) and the cross-linker (calcium chloride, for example) may preferably be maintained at about room temperature or below room temperature, and above freezing of the solutions.

As apparent from the description of the present invention, the composition of a low-gelatin containing simulated egg yolk may vary greatly qualitatively and quantitatively as to individual ingredients. The following examples are thus considered to be illustrative of useful low gelatin containing simulated egg yolk compositions in accordance with the present invention.

EXAMPLE I

| INGREDIENTS | % BY WEIGHT |
| --- | --- |
| Freezist M (Starch) | 30 |
| Non-fat Dry Milk | 17 |
| Gelatin | 7.5 |
| 1% Beta-Carotene (Water Dispersible) | 2.5 |
| Flavor | 0.5 |
| Water | 220.0 |

Procedure

The dry ingredients were premixed together to form a homogeneous mixture prior to being added to the water at about room temperature. The mixture of simulated egg yolk components were gently heated under agitation to a final temperature of about 160° F. Once the viscosity of the mixture stabilized as evident by no further thickening, the mixture was cooled in an ice bath under continuous agitation until the mixture attained the form of an extrudable thermoreversible homogeneous gel as evident by a dull appearance at a temperature of about 50° F. The mixture was subsequently extruded and encapsulated with restrictive barrier as to be described hereinafter.

EXAMPLE II

It was discovered by the inventor that by replacing some of the water in the composition with natural egg white, the whole eggs when fried, could be turned over with lower probability of running of the egg yolk. Of significance it was discovered that although the egg yolks containing a quantity of natural egg white had a consistency similar to those made in accordance with Example 1, they became less viscous with time, even in the absence of any water as when dispersed in the natural egg white. This has the benefit of enabling the shaping of a simulated egg yolk in the form of a disk, which after being encapsulated with a restrictive barrier, attains lower viscosity without absorbing water or changing its volume, or bursting, and one which behaves more like a real egg yolk, depending on the amount of natural egg white present. An illustrative composition of the foregoing is as follows:

| INGREDIENTS | % BY WEIGHT |
| --- | --- |
| Freezist M (Starch) | 30 |
| Non-fat Dry Milk | 17 |
| Gelatin | 7.5 |
| 1% Beta-Carotene (Water Dispersible) | 2.5 |
| Flavor | 0.5 |
| Water | 165.0 |
| Egg White | 55.0 |

Procedure

The procedure of Example I was followed, except for the addition of the natural egg white. The mixture was heated under agitation until no further thickening occurred. The mixture was then cooled in an ice bath under constant agitation until the temperature dropped to below the coagulation of natural egg whites, about 140° F. At this point, the egg white was added, and the cooling of the mixture under continuous agitation was continued as in Example I.

EXAMPLE III

The composition of Example II was cooled without stirring, and placed in a conventional cookie extruder in a refrigerator overnight. The following day, when the composition was extruded, a very non-uniform and curly extrudate was obtained. However, by taking the same composition out of the extruder, pureeing it well with a spatula, thus breaking the gel's structure, the composition was extruded to obtain a good extrudate. Similar results were obtained from the composition of Example I.

An apparatus for making a simulated egg yolk in accordance with the present invention will now be described with reference to FIGS. 1–4, wherein like referenced numerals represent like elements. Referring specifically to FIG. 1, the apparatus includes a piston extruder 10 constructed in the form of a longitudinally extending hollow cylinder 12 of uniform diameter having an air inlet 13 adjacent its upper end. One end of the cylinder 12 communicates with a T-shaped extension 14 of smaller diameter. The extension 14 includes a straight-through conduit 16 controlled by a valve 18, and a transversely arranged conduit 20 controlled by a valve 22. Preferably, valves 18 and 22 are of the ball-valve type. The mouth of the straight-through conduit 16 may be sized and shaped for the shape of the particular extrusion of the simulated egg yolk desired. In the alternative, a suitable die may be removably secured thereto such as via threads and the like.

Positioned adjacent the mouth of the straight-through conduit 16 is a reciprocal knife assembly 24 as best shown in FIG. 2. The knife assembly 24 includes an air cylinder 26 having a moveable cylinder rod 28 to which there is connected a U-shaped bracket 30 having a cutting wire 32 stretched across and attached to the opening thereof. Received within the other end of the cylinder 12, is a piston 34 attached to a shaft 36 which is operatively coupled to a linear driving mechanism 38. The driving mechanism 38 is, in turn, connected to an actuating lever 40 which is operated by an air cylinder 42 having a cylinder rod 43.

Directly underlying the piston extruder 10 is a first container 44 which contains an inclined support 46 in the nature of a smooth planar plate having an uninterrupted surface. The support 46 is arranged at an incline so as to extend over a sidewall of the container 44 via a downwardly bend extension 48. Overlying the first container 44 is a moveable first pusher 50 as best shown in FIG. 3. The first pusher 50 includes an extension 52 which rests on the surface of the support 46 and includes a generally elongated central opening 54. The extension 52 may be higher than the one illustrated in FIG. 3, it may be perforated, or it ma be made of screen material, or bent wire, and the like, in order to allow free movement of liquid therethrough. The first pusher 50 is connected to an air cylinder 56 by means of a first arm 58. By operation of the air cylinder 56, the extension 52 of the first pusher 50 is slid upwardly across the surface of the support 46. Excess setting solution 60 within the first container 44 is allowed to flow through the opening 54 so as not to be dragged out of the container.

A second container 62 is positioned adjacent the first container 44 and is similarly constructed. In this regard, the second container is provided with an inclined support 46' underlying a second moveable pusher 50'. The second container 62 is filled with a film forming solution 64. Positioned adjacent the second container 62 and underlying the bend extension 48' of the support 46' is a third container 66 containing a quantity of liquid egg white 68.

Not shown in FIG. 1 for purpose of clarity, the first container 44 containing the setting solution 60 and second container 62 containing the film forming solution 64 are provided with liquid level control devices and filtering devices. When the liquid level within the respective first and second containers 44, 62 falls below a certain predetermined level, fresh solution, i.e., setting solution or film forming solution, is added from a respective larger reservoir. The setting solution 60 and film forming solution 64 are also pumped continuously or intermittently through appropriate filters for removing small egg-yolk pieces, gels, etc. using a peristaltic pump or the like. Finally, the limiting and/or activating switches as shown in FIG. 4 will be described with reference to the process for extruding the simulated egg yolk material and forming a restrictive barrier thereon.

Simulated egg yolk material, such as prepared pursuant to Examples I–III is pumped at a temperature in a preferable range of 32°–65° F. through conduit 20 into the interior of the cylinder 12 with valve 22 open and valve 18 closed. The air inlet 13 at the top of the cylinder 12 prevents air from being entrapped under the piston 34 as the simulated egg yolk material 70 fills the cylinder. When the cylinder 12 has been filled to the level of the piston 34, valve 22 is closed and valve 18 within the conduit 16 is opened.

Every time actuating lever 40 is raised by operation of air cylinder 42, the shaft 36 is pushed downward displacing the piston 34 a predetermined distance. As the piston 34 is displaced longitudinally within the cylinder 12, a predetermined quantity of simulated egg yolk material 70 is extruded from opening 72. The return of actuating lever 40 to its initial position has no effect on movement of the shaft 36. When the appropriate amount of simulated egg yolk material 70 has been extruded through opening 72, the knife assembly 24 is activated via air cylinder 26 such that the cutting wire 32 cuts through the simulated egg yolk material 70 forming an egg yolk disk 74, which falls into the underlying first container 44 containing the setting solution 60, e.g., 4% calcium chloride and water. The wire cutting 32 of the knife assembly 24 begins cutting the simulated egg yolk material 70 at location 76 which is at the beginning of the opening 72, and stops cutting at position 78, which is at the end of the opening.

The egg yolk disk 74 falls through the setting solution 60 onto the support 46. Activation of the first moveable pusher 50 by means of air cylinder 56 causes the egg yolk disk 74 to be slid upwardly across the surface of the support 46 by engagement with extension 52. The egg yolk disk 74 is slid over the bend extension 48 of the support 46 whereupon it falls into the underlying second container 62 containing film forming solution 64, which is a cross-linkable polymer, e.g., 1% Keltone HV (from Kelco, Clark, N.J.) which is high viscosity sodium alginate, and water. As the extension 52 breaks the surface 80 of the setting solution 60, the excess setting solution will drain back into the first container 44 through the opening 54 within the extension. In a similar manner, the second moveable pusher 50' advances the egg yolk disk 74 across the support 46' and out of the film forming solution 64 until it reaches the bend extension 48' where it falls into container 66 containing the liquid egg white 68 for packaging therewith.

Referring to FIG. 4, there is shown the air cylinders 24, 42, 56 and 56', as well as limiting switches represented by small rectangles with a number and single letter beside the switches. The number indicates the air cylinder to which an action will take place when the switch under consideration is pushed. The letter shows whether the air cylinder will advance (A) or will reverse (R) its arm during operation. All air cylinders are double acting by arrangements very well known in the art. They are activated by a temporary closing of a respective switch, and are provided with special valves which may regulate accurately the advancing or reversing speed of the respective arms of the air cylinders 26, 42, 56 or 56'. Air cylinders 26 and 42 are arranged to normally have their arms reversed, while air cylinders 56 and 56' are arranged to normally have their arms advanced.

The operation of the air cylinders 26, 42, 56 and 56' vis-a-vis the actuating switches with respect to the extrusion of simulated egg yolk material 70 into egg yolk disks 74 to which a restrictive barrier is formed thereon will now be described. By using an overriding switch (not shown) a signal is given to air cylinder 42, which advances its cylinder rod 43 in a fast mode. As cylinder rod 43 advances, it first pushes actuating lever 40 upward so that the extrusion of the simulated egg yolk material 70 is initiated by advancement of the piston 34 within the cylinder 12. The position of the air cylinder 42 is arranged (by a conventional screw-type raising and lowering mechanism, not shown for purposes of clarity) such that when the cylinder rod 43 is fully extended, a predetermined amount of the simulated egg yolk material 70 is extruded through opening 72. At this point, a set S1 of two switches is activated. Activation of the first switch 42R causes cylinder rod 43 of air cylinder 42 to quickly reverse to its normal position as shown in FIG. 1. Activation of the second switch 26A causes cylinder rod 28 of air cylinder 26 to advance so-that (i) the time it takes for the cutting wire 34 of the knife assembly 24 to reach initial position 76 is sufficient for the simulated egg yolk material 70 which has been extruded through the opening 72 to have reached volume equilibrium, (ii) the time it takes for the cutting wire 34 to advance from initial position 76 to final position 78 is sufficient to produce a cut without back-sticking, and (iii) the time it takes for the cylinder rod 28 to reach the set S2 switches is sufficient to allow the egg yolk disk 74 to fall into the first container 44 containing the setting solution 60. It is preferable that the switch 26A is activated before the switch 42R has been activated in order to ensure the activation of both switches. This is because if switch 42R is activated prematurely causing the cylinder rod 43 to reverse to its initial position prematurely, the switch 26A may not find a chance to be activated. This in turn would cause interruption of the operation.

Activation of set S2 of switches 56R and 26R causes cylinder rod 28 of air cylinder 26 to quickly reverse, coming to its normal rest position, and also causing arm 58 of air cylinder 56 to reverse slowly. This causes the extension 52 to slowly slide the egg yolk disk 74 upwardly along the surface of the support 46 until at the bend extension 48, the egg yolk disk falls into the second container 62 containing the film forming solution 64. Again, switch 56R should be activated before switch 26R to ensure uninterrupted operation. After ensuring that the egg yolk disk 74 has fallen into the second container 62, the arm 58 of the first moveable pusher 50 activates the set S3 of switches 42A, 56A, and 56'R. Again, switch 56A should be activated last in order to ensure uninterrupted operation. This causes (i) the first arm 58 to advance quickly to its normal position, (ii) second arm 58' of the second moveable pusher 50' to reverse slowly so that the second extension 52' slides the egg yolk disk 74 upwardly across the surface of the support 46' and out of the film forming solution 64 until the disk falls over the bend extension 48' and into the third container 66, and (iii) cylinder rod 43 of air cylinder 42 to rapidly advance, thus automatically starting a new extrusion cycle. In the meantime, second arm 58' of air cylinder 56', which has already caused the egg yolk disk 74 to fall into third container 66, reaches set S4 of a single switch 56'A, which causes second arm 58" to advance quickly to its normal position.

The following examples are considered illustrative of forming a restrictive barrier on extruded disks of simulated egg yolk material in accordance with the apparatus of the present invention as thus far described.

EXAMPLE IV

Formation of Restrictive Barrier

A first bath was prepared by dissolving 4 parts of anhydrous calcium chloride (setting agent) in 96 parts of water by weight.

A second bath was prepared by dissolving one part of Keltone HV (high viscosity sodium alginate from KELCO, as film former) in 99 parts of water by weight.

A homogenized gel was prepared as described in Example I, and fed into an extruder. In sequence, the homogenized gel was extruded and simultaneously wire-cut into disks having a thickness of about ¼" and a diameter of about 1½". Each disk was arranged to fall into the first bath on an inclined first support at a rate of 1 yolk per 5 seconds. The inclined first support had a portion extending over the second bath which contained the solution of the film former. After each yolk fell on the first support, it was forced to slide on the first support and fall into the second bath (containing the film former) on a second support. The yolk was once again forced to slide on the second support and fall into a container containing egg white. The residence time of the egg yolk in each of the two solutions can be adjusted, and is typically in the range of from about 1 to 5 seconds, and more preferably in the range of from about 1 to 3 seconds. The whole operation of forming the restrictive barrier took place at room temperature.

EXAMPLE V

The same procedure was followed as described in Example IV, with the difference that the homogenized gel was extruded at a temperature of 45°–55° F.

EXAMPLE VI

The same procedure was followed as described in Example IV, with the difference that the first and the second baths were maintained at a temperature of 45°–55° F.

EXAMPLE VII

The same procedure was followed as described in Example IV, with the difference that the operation of forming the restrictive barrier took place at a temperature of 45°–55° F.

EXAMPLES VIII, IX, X, AND XI

Some of the eggs produced according to Examples IV, V, VI, and VII, were fried on a grill in a sunny-side-up mode, just using a spray release (PAM, sold in supermarkets) on the grill. The yolks were fully molten by the time the white was just fully cooked, without any signs of it being overcooked, or burned.

EXAMPLE XII

A number of eggs were made as described in Example IV, with the difference that instead of using the homogenized gel of Example I, the homogenized gel of Example II was used.

EXAMPLE XIII

A number of simulated whole eggs made as described in Example IV were fried on one side, and then they were turned over. In some cases the yolk did not break, and in some cases it broke.

EXAMPLE XIV

A number of simulated whole eggs made as described in Example XII were fried on one side, and then they were turned over. None of the yolks broke.

EXAMPLE XV

Eggs were made as described in Example IV with the difference that the first bath contained 1 part by weight Anhydrous calcium chloride and 99 parts water. Upon frying the eggs, their restrictive barrier seemed to be considerably weaker than that of fried eggs made in accordance with Example IV, approaching an unacceptable level.

EXAMPLE XVI

Eggs were made as described in Example IV with the difference that the first bath contained 8 parts by weight Anhydrous calcium chloride and 92 parts water. Upon frying the eggs, their restrictive barrier seemed to be considerably tougher than that of fried eggs made in accordance with Example IV, approaching again an unacceptable level.

EXAMPLE XVII

Eggs were made as described in Example IV with the difference that the second bath contained 0.25 parts by weight Keltone HV and 99.75 parts water. Upon frying the eggs, their restrictive barrier seemed to be considerably weaker than that of fried eggs made in accordance with Example IV, approaching an unacceptable level.

EXAMPLE XVIII

Eggs were made as described in Example IV with the difference that the second bath contained 3 parts by weight Keltone HV and 97 parts water. The viscosity of the bath seemed to be undesirably high, causing excessive quantities of solution to be transferred to the egg white.

EXAMPLE XIX

A conventional gel was made by using the ingredients in the amounts shown in Example I. After the ingredients were mixed, and heated to about 160° F. to hydrate the starch, the mixture was poured in a mold and allowed to form a gel under static conditions (no agitation) in the refrigerator. After about 3 hours, the gel was removed from the refrigerator and introduced in the extruder to form yolks as in example IV. The extrudate and the yolks produced were of very irregular peripheral shape.

EXAMPLE XX

Yolks were made as described in Example IV with the difference that the two baths were reversed, so that the yolks were first introduced to the film former (sodium alginate) second bath and then to the setting agent (calcium chloride) first bath. The restrictive barriers produced in this manner were of very non-uniform thickness and consistency. The respective eggs, when fried, exhibited a bitter taste.

EXAMPLE XXI

A homogenized gel of simulated egg yolk material is prepared as described in any one of Examples I–III and extruded through the apparatus as disclosed in FIG. 1. Instead of dropping the simulated egg yolk disk directly into the setting solution, the egg yolk disk is dropped into an edible moisture absorbing composition such as cornstarch to make the egg yolk more handable. The egg yolk disk is subsequently sequentially transferred through the setting solution and film forming solution to form the restrictive barrier. In addition, pursuant to this embodiment, the size of the egg yolk disk which is extruded is somewhat smaller in diameter than that previously described. This results in an egg yolk disk which is somewhat thicker than that previously described. The thus extruded egg yolk disk is pressed between two plates (not shown) to thin the disk and to thereby increase its diameter after coating with the cornstarch. This results in the simulated egg yolk disk becoming oval-like cross-section and having a more natural appearance.

The principles, preferred embodiments, and modes of operation of the present invention have been described in the foregoing specification. The invention which is intended to be protected herein, however, is not to be construed as limited to the particular embodiments disclosed, since these are to be regarded illustrative rather than restrictive. Variations and changes may be made by others without departing from the spirit and scope of the invention.

What is claimed is:

1. A simulated egg yolk comprising a mixture of simulated egg yolk components, said components at least including an edible liquid and a positive thermoreversible gel former, said positive thermoreversible gel former present in an amount of from about 2.5–9.0 parts per hundred parts by weight of said edible liquid, said egg yolk being a nonflowable thermoreversible homogenized gel at room temperature so as to substantially retain its shape until being heated to a higher temperature at which said egg yolk becomes flowable, thereby resembling a natural egg yolk.

2. The simulated egg yolk of claim 1, wherein said positive thermoreversible gel former is present in an amount of from about 3.0–6.0 parts per hundred by weight of said edible liquid.

3. The simulated egg yolk of claim 1, wherein said positive thermoreversible gel former is present in an amount of from about 3.0–4.0 parts per hundred parts by weight of said edible liquid.

4. The simulated egg yolk of claim 1, wherein said egg yolk components further comprise a negative non-thermoreversible gel former.

5. The simulated egg yolk of claim 4, wherein said negative non-thermoreversible gel former comprises egg-albumin.

6. The simulated egg yolk of claim 1, wherein said components further include a viscosity builder, milk solids and a colorant.

7. The simulated egg yolk of claim 6, wherein said viscosity builder is selected from the group consisting of starches and gums.

8. The simulated egg yolk of claim 7, wherein said viscosity builder is a freeze-thaw stable starch.

9. A simulated raw whole egg comprising liquid egg white and a simulated egg yolk of claim 1 disposed in said egg white in a separate phase.

10. A shaped simulated egg yolk comprising a mixture of simulated egg yolk components, said components at least including an edible liquid and a positive thermoreversible gel former, said positive thermoreversible gel former present in an amount of from about 2.5–9.0 parts per hundred parts by weight of said edible liquid, said mixture having been heated above room temperature and subsequently having been cooled under continuous mixing until said mixture has formed a thermoreversible homogenized gel, said gel having been extruded at a temperature lower than the melting point of said gel into a predetermined shape to form said shaped simulated egg yolk, said egg yolk being nonflowable at room temperature.

11. The shaped simulated egg yolk of claim 10, wherein said mixture has been cooled during said continuous mixing to a temperature below about 50° F.

12. The shaped simulated egg yolk of claim 10, wherein said mixture has been heated to a temperature in the range of about 150°–180° F.

13. The shaped simulated egg yolk of claim 10, wherein said positive thermoreversible gel former is present in an amount of from about 3.0–6.0 parts per hundred by weight of said edible liquid.

14. A simulated raw whole egg comprising liquid egg white and a simulated egg yolk of claim 13 disposed in said egg white in a separate phase.

15. The simulated of egg yolk of claim 13, wherein said egg yolk components further comprise egg-white.

16. The shaped simulated egg yolk of claim 13, wherein said positive thermoreversible gel former is present in an amount of from about 3.0–4.0 parts per hundred parts by weight of said edible liquid.

17. A simulated raw whole egg comprising liquid egg white and a simulated egg yolk of claim 16 disposed in said egg white in a separate phase.

18. The simulated of egg yolk of claim 16, wherein said egg yolk components further comprise egg-white.

19. A simulated raw whole egg comprising liquid egg white and a simulated egg yolk of claim 10 disposed in said egg white in a separate phase.

20. The method of making a simulated egg yolk of claim 19, wherein said positive thermoreversible gel former is present in an amount of from about 3.0–4.0 parts per hundred parts by weight of said edible liquid.

21. The method of making a simulated egg yolk of claim 19, wherein said mixture further includes a viscosity builder and milk solids.

22. The simulated egg yolk of claim 10, wherein said egg yolk components further comprise egg-white.

23. A simulated egg yolk comprising a mixture of simulated egg yolk components, said mixture being in the form of a nonflowable homogenized gel at about room temperature.

24. The simulated egg yolk of claim 23, wherein said gel is in the form of a homogeneous puree.

25. The simulated egg yolk of claim 23, wherein said mixture comprises an edible liquid, a colorant, a gel former, a viscosity builder and milk solids.

26. The simulated egg yolk of claim 23, wherein said mixture comprises at least an edible liquid and a gel former, said gel former present in an amount of from about 2.5–9.0 parts per hundred parts by weight of said edible liquid.

27. The simulated egg yolk of claim 26, wherein said gel former is present in an amount of from about 3.0–6.0 parts per hundred by weight of said edible liquid.

28. The simulated egg yolk of claim 27, wherein said film former comprises a water soluble alginate compound and the setting agent comprises alkaline earth ions.

29. A simulated raw whole egg comprising liquid egg white and a simulated egg yolk of claim 23 disposed in said egg white in a separate phase.

30. A method of making a simulated raw whole egg comprising preparing a simulated egg yolk in accordance with claim 23, and adding said simulated egg yolk to liquid egg white.

31. The method of making a simulated raw whole egg in accordance with claim 30, further including forming a restrictive barrier encapsulating said yolk.

32. The method of making a simulated raw whole egg in accordance with claim 31, further including extruding said gel to form said egg yolk into a predetermined shape prior to forming said barrier.

33. A method of making a simulated egg yolk comprising preparing a mixture of simulated egg yolk components and encapsulating said mixture with a restrictive barrier, said barrier formed by coating said mixture first with a setting agent, and then, with a film former which is reactive with said setting agent to form said barrier.

34. The method of making a simulated egg yolk of claim 33, wherein said setting agent comprises alkaline earth ions.

35. The method of making a simulated egg yolk of claim 33, wherein said film former comprises a hydrocolloid.

36. The method of making a simulated egg yolk of claim 35, wherein said hydrocolloid comprises sodium alginate.

37. The method of making a simulated egg yolk of claim 33, wherein said mixture comprises an edible liquid, a colorant, and a viscosity modifier.

38. A simulated raw whole egg comprising liquid egg white and a simulated egg yolk made in accordance with the method of claim 33 disposed in said egg white in a separate phase.

39. A method of making a simulated egg yolk comprising the steps of:

a) making a mixture of egg yolk components;

b) forming said mixture into a shaped egg yolk;

c) coating said shaped egg yolk first with a setting agent, and then with a film former which is reactive with said setting agent to form a restrictive barrier.

40. A method of making a simulated egg yolk comprising the steps of:

a) forming sticky homogenized simulated egg-yolk gel disks;

b) removing the stickiness of the homogenized gel disks; and c) applying a restrictive barrier around said disks.

* * * * *